United States Patent

[11] 3,603,980

[72] Inventors Edgar W. VanWinkle Rutherford; Henry R. Kosakowski, Lyndhurst; Walter P. Hollinger, Ramsey, all of, N.J.
[21] Appl. No. 863,622
[22] Filed Oct. 3, 1969
[45] Patented Sept. 7, 1971

[54] DIGITAL RATE GENERATOR
4 Claims, 4 Drawing Figs.

[52] U.S. Cl. 340/347 AD, 328/132
[51] Int. Cl. H03k 13/20
[50] Field of Search 340/347 AD; 328/132; 307/152

[56] References Cited
UNITED STATES PATENTS

| | | | |
|---|---|---|---|
| 3,327,229 | 6/1967 | Huelsman | 340/347 X |
| 3,351,932 | 11/1967 | Hibbits et al. | 340/347 |

*Primary Examiner*—Maynard R. Wilbur
*Assistant Examiner*—Michael K. Wolensky
*Attorneys*—Anthony F. Cuoco and Plante, Hartz, Smith and Thompson

ABSTRACT: Apparatus associated with a digital condition sensor for providing a digital condition rate signal as a closed loop function of the sensed condition, and which signal is a continuous and precise measure of condition rate.

INVENTORS
EDGAR W. VAN WINKLE
HENRY R. KOSAKOWSKI
WALTER P. HOLLINGER
BY [signature]
ATTORNEY INVENTORS
EDGAR W. VAN WINKLE
HENRY R. KOSAKOWSKI
WALTER P. HOLLINGER
BY
ATTORNEY INVENTORS
EDGAR W. VAN WINKLE
HENRY R. KOSAKOWSKI
WALTER P. HOLLINGER
BY
ATTORNEY

DIGITAL RATE GENERATOR

BACKGROUND OF THE INVENTION

1. Field of the Invention

This invention relates to apparatus for providing digital rate signals and, more particularly, to apparatus associated with a digital condition sensor for providing digital condition rate signals.

2. Description of the Prior Art

Prior to the present invention, digital signals corresponding to, for example, aircraft altitude rate, have been obtained by measuring atmospheric pressure change for a fixed time, or time for a fixed pressure change. The difficulty encountered is that the fixed time or fixed change must be relatively large for proper resolution and accuracy since small time or change intervals limit accuracy. The device of the invention overcomes these problems by generating a position rate signal directly for providing apparatus having improved resolution and accuracy.

SUMMARY OF THE INVENTION

This invention contemplates a condition rate generator including a condition transducer and a quadrature rejection circuit responsive to the signal from the transducer for providing an error signal. The error signal is conditioned and applied to a voltage controlled oscillator which provides a pulse output having a predetermined frequency. The pulses are applied to a frequency divider for providing a pulse train at another lesser frequency and which latter pulses are fed back to the transducer. As the error signal increases, the transducer is driven to reduce the error signal at a faster rate so that the oscillator output corresponds to condition rate. The pulse output from the oscillator is converted to digital form by gating it to a counter and storage register over a fixed interval, and at the end of each such interval the register provides a digital word corresponding to condition rate.

One object of this invention is to employ digital condition sensing apparatus for providing a digital condition rate signal.

Another object of this invention is to provide a rate generator of the type described having improved resolution and accuracy.

Another object of this invention is to provide the rate signal as a closed loop function of the condition for improving system accuracy and stability.

Another object of this invention is to provide apparatus of the type described having reduced cost and complexity.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

DESCRIPTION OF THE INVENTION

Figure 1:
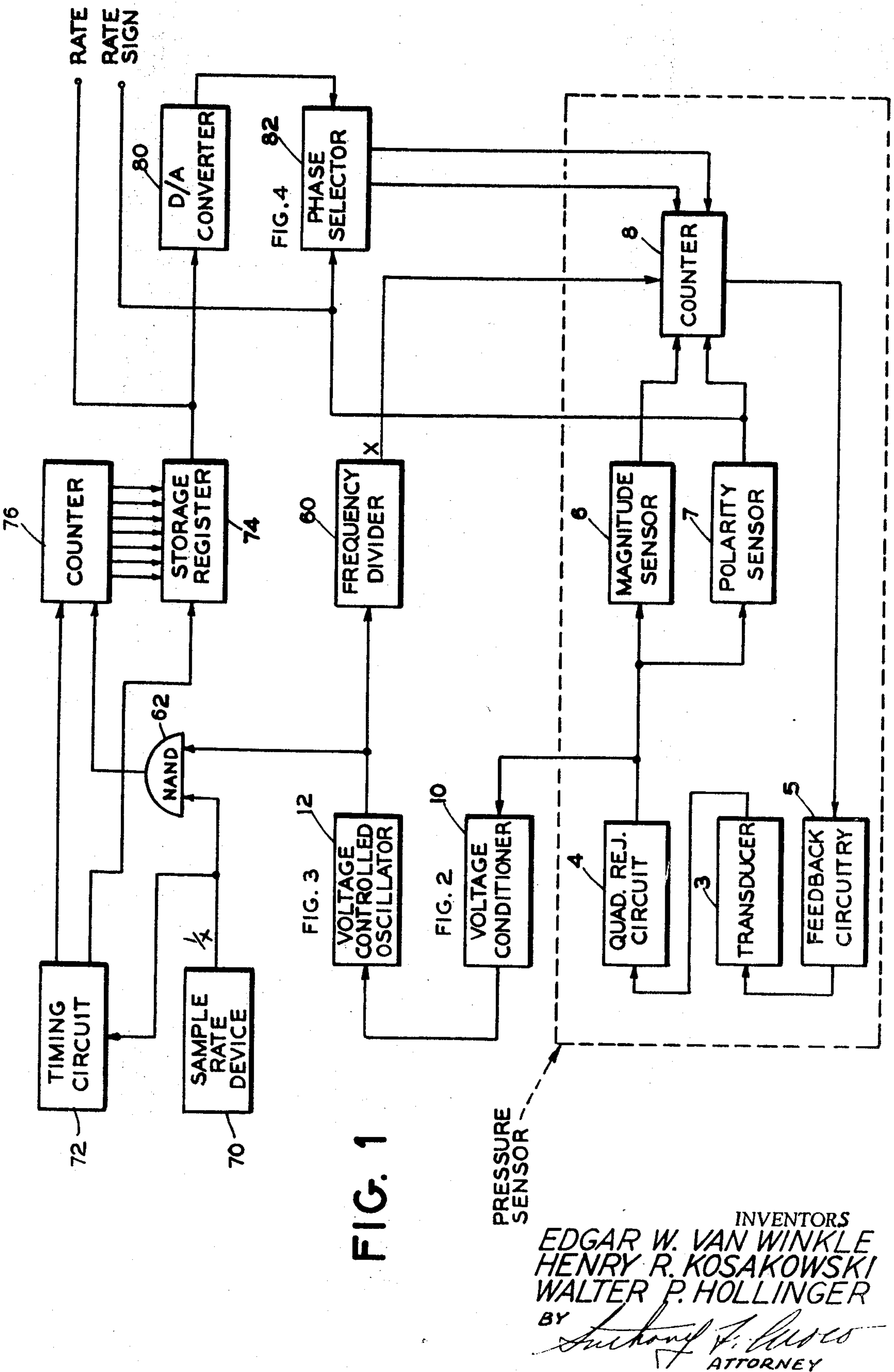
FIG. 1 is a block diagram of a digital rate generator according to the invention.

With reference to FIG. 1, there is shown a pressure sensor 2 of the type used for measuring aircraft altitude and including a transducer 3, a quadrature rejection circuit 4, a magnitude sensor 6, a polarity sensor 7, a counter 8 and associated feedback circuitry 5 connecting counter 8 to transducer 3.

Pressure sensor 2 is of the type disclosed and claimed in copending U.S. Application Ser. No. 855,262, filed Sept. 4, 1969, by Henry Kosakowski and assigned to The Bendix Corporation, assignee of the present invention.

For purposes of describing the present invention, it will suffice to say that transducer 3 includes a suitable diaphragm and resolver arrangement for sensing changes in atmospheric pressure commensurate with the altitude of an aircraft, and for providing an analog error signal corresponding to the difference between the sensed pressure and the digital pulse output from the counter. The analog signal is converted into pulses by the counter, and which analog error signal is applied to the counter through quadrature rejection circuit 4 and associated magnitude and polarity sensors 6 and 7 which operate counter 8.

Counter 8 is connected through feedback circuit 5 to transducer 3 as heretofore noted, and the error signal therefrom approaches zero or nulls out when the counter output corresponds to sensed pressure. As described in the aforenoted U.S. Application Ser. No. 855,262, the null is defined by a pair of reference voltages and counting is stopped when the amplitude of the error signal is greater than one reference voltage and less than the other.

Quadrature rejection circuit 4 is connected to a voltage conditioner 10 and therethrough to a voltage controlled oscillator 12. Voltage conditioner 10 and oscillator 12 are shown generally in FIG. 1 and are shown in substantial detail in FIGS. 2 and 3, respectively.

Voltage conditioner 10 conditions the output from quadrature rejection circuit 4, as will be hereinafter explained, so as to make said voltage compatible with oscillator 12. Oscillator 12 is connected to a frequency divider 60 and therefrom through counter 8 and feedback circuit 5 to transducer 3 forcing the feedback loop to assume null conditions as heretofore noted. When the pressure sensed by transducer 3 is changing at a constant rate, oscillator 12 is forced to provide a pulse output at a particular frequency which affects quadrature rejection circuit 4 in pressure sensor 2 so that a constant signal is provided thereby. At this point, the frequency of the pulse output from oscillator 12 is an accurate representation of the rate of change of pressure as sensed by transducer 3 and hence corresponds to altitude rate.

Figure 2:
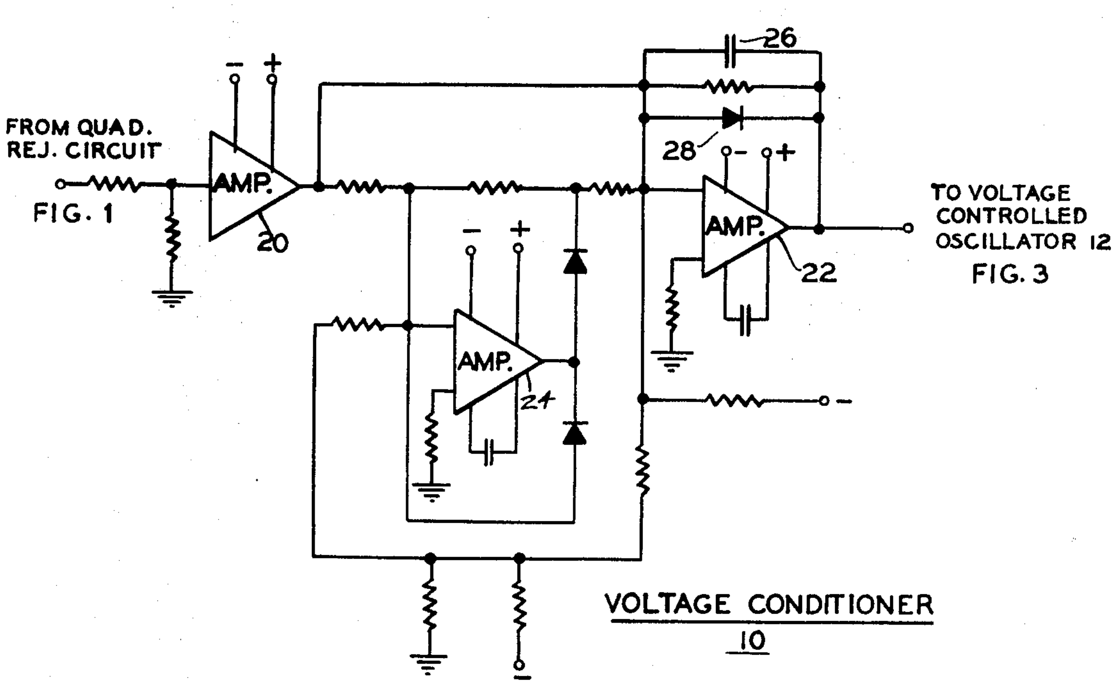
FIG. 2 is an electrical schematic diagram showing in substantial detail the voltage conditioner shown in FIG. 1.

With reference to FIG. 2, error voltage conditioner 10 includes an amplifier 20, an amplifier 22 and an amplifier 24. It will be understood that the signal from quadrature rejection circuit 4 may, for purposes of example, have a swing of ±0.6 volts, while oscillator 12 requires an input which swings from +11.6 volts to −0.4 volts. Error voltage conditioner 10 affects the output from quadrature rejection circuit 4 so as to establish these limits.

Thus, amplifier 20 in error voltage conditioner 10 is an isolation amplifier with unity gain and amplifiers 22 and 24 are arranged to provide an absolute value circuit with a gain, for example, of 20. Amplifier 22 doubles as a summing amplifier to insure that the aforenoted voltage limits are met. A capacitor 26 is connected in feedback relation to amplifier 22 to provide an R-C filter for eliminating noise from the conditioned voltage, and a diode 28 connected across amplifier 22 insures that the negative output voltage swing never exceeds the aforementioned −0.4 volt limit.

Figure 3:
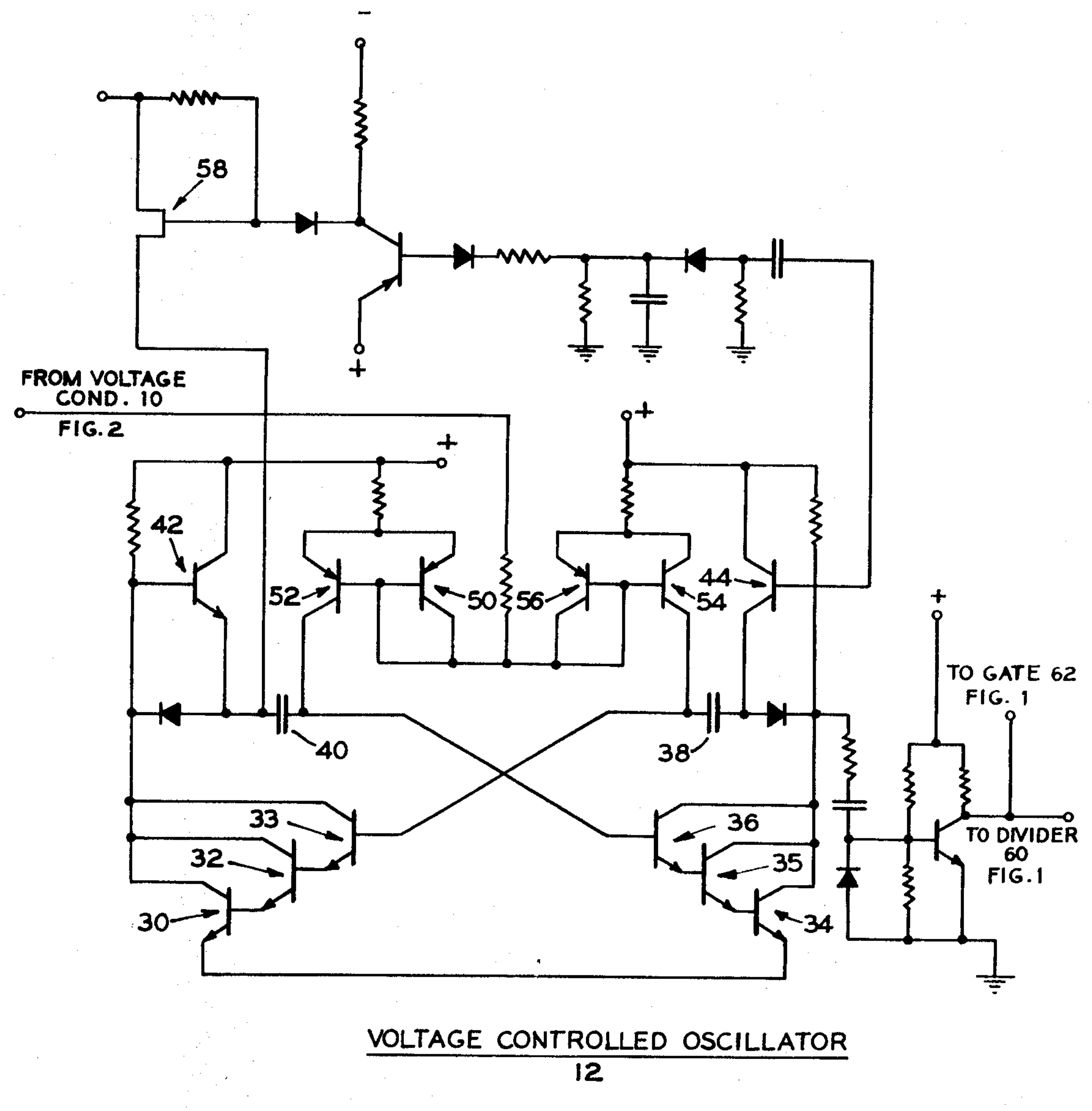
FIG. 3 is an electrical schematic diagram showing in substantial detail the oscillator shown generally in FIG. 1.

With reference to FIG. 3, oscillator 10 is basically a free running multivibrator of conventional type and has a cascaded group of three transistors 30, 32 and 33 and another cascaded group of three transistors 34, 35 and 36 to reduce charging current required through timing capacitors 38 and 40, and thereby provides a wider frequency range capability. Transistors 42 and 44 are arranged with said cascaded transistor groups to insure quicker discharge of timing capacitors 38 and 40, and therefore oscillator 10 is able to provide pulse trains at higher frequencies than would otherwise be the case. Transistors 50 and 52, and 54 and 56 act as two current sources making linear tuning of oscillator 12 possible. A circuit including a field defect transistor 58 is arranged to monitor the output of oscillator 12, and if said oscillator fails to start, transistor 58 is rendered conductive for forcing said oscillator to start.

Voltage controlled oscillator 12 is connected to a frequency divider 60 as shown generally in FIG. 1 and to a gate 62. The division factor $x$ of frequency divider 60 determines the number of times per second the output from oscillator 20 is sampled and reduces the frequency of the pulse train therefrom to an appropriate range commensurate with required sensitivity. The output from frequency divider 60, which is a pulse train at some frequency $1/x$ less than that of the pulse train from voltage control oscillator 12, is applied to counter 8 and serves to update said counter at predetermined intervals.

Oscillator 12 is connected to gate 62 as is a pulse source 70 which provides pulses at logic "one" and logic "zero" levels and at a frequency of $1/x$ for enabling gate 62 to pass the pulse output from oscillator 12 to a counter 76. Counter 72 may be, for example, a simple 11-bit counter for counting the pulses from oscillator 12 during the time that gate 62 passes said pulses to the counter.

Pulse source 70 is connected to a timing circuit 72, and which timing circuit 72 provides two pulses when the pulse from pulse source 70 drops to a logic "low" level, and at which time gate 62 passes the pulses from oscillator 12 to counter 76. Timing circuit 72 is connected to counter 76 to a storage register 74. The first of the two pulses from timing circuit 72 is applied to storage register 74 to enable the storage register, whereupon information is transferred thereto from a counter 76 and the other pulse from timing circuit 72, operates to reset counter 76. The output from storage register 74 is a digital output corresponding to pressure rate. The sense of pressure rate is provided by a signal from polarity sensor 7 in pressure sensor 7, and which polarity sensor connects quadrature rejection circuit 4 to counter 8. It is to be noted that storage register 74 associated with counter 76 is necessary for providing a constant rate output during the time that counter 76 is counting.

Storage register 74 is connected to a digital-to-analog converter 80 which may be of a conventional type having 11-bit resolution. Converter 80 is connected to phase selector 82 as is polarity sensor 7 in pressure sensor 2.

Figure 4:
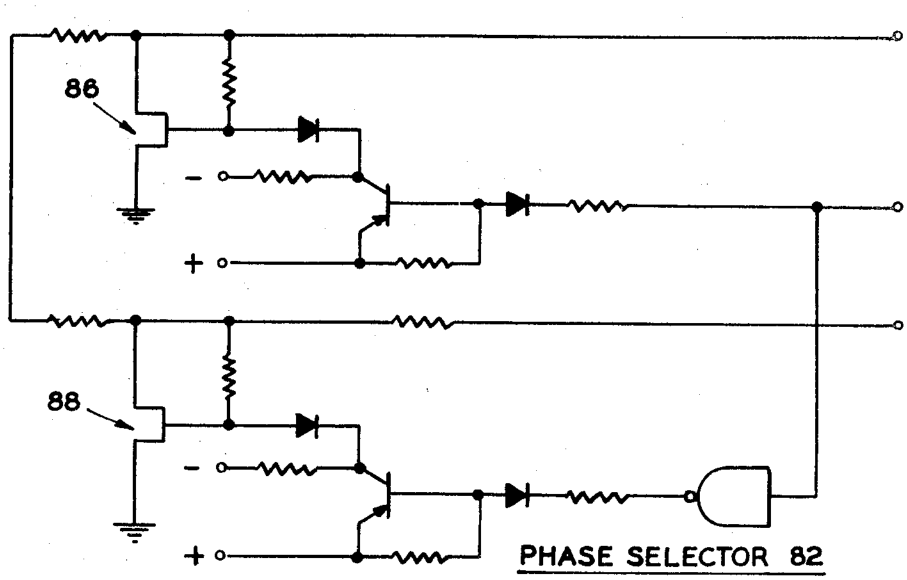
FIG. 4 is an electrical schematic diagram showing in substantial detail the phase selector shown generally in FIG. 1.

Phase selector 82, shown in substantial detail in FIG. 4, includes a pair of field effect transistor switches 86 and 88 controlled by polarity sensor 7 for selecting appropriate means in the feedback circuitry to maintain negative feedback.

OPERATION OF THE INVENTION

As may be seen, from the aforegoing description of the invention, condition rate is provided as an integral part of the condition sensor feedback loop and thus accuracy and stability are enhanced. Since rate is a measure of the velocity of condition change and condition rate is generated by the same signal causing the condition to change, the digital rate signal is a precise measure of condition rate.

When a change in the condition is sensed by transducer 3, an error signal is provided at the output of quadrature rejection circuit 4. This error signal is conditioned by voltage conditioner 10 so as to make it compatible with the characteristics of oscillator 12. The output from oscillator 12 is a pulse train having a frequency proportional to the input thereto from voltage conditioner 10. This frequency is divided by a factor $x$ and returned to the transducer feedback control loop. As the condition error signal increases, the frequency of the pulse output from oscillator 12 increases, thereby forcing the feedback control loop to reduce the condition error at a faster rate and, thus, the output of oscillator is in effect condition rate.

The frequency of the pulse train from oscillator is converted to digital form by gating said pulse train through gate 62 over a fixed time period equal to the reciprocal ($1/x$) of the frequency division factor ($x$) as implemented by pulse source 70.

It will now be understood that at the end of periodic intervals, counter 76 provides a digital word equivalent to condition rate. The digital word is converted to an analog signal which is fed back to the transducer control loop for providing a high degree of feedback loop stability. The resolution of the system is controlled by division factor $x$, and as $x$ increases resolution increases.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Apparatus for providing a digital output corresponding to rate of change of a condition comprising:
   - signal means for providing an analog error signal corresponding to the difference between the digital output and the condition;
   - an oscillator connected to the signal means for providing a pulse output at a frequency representing the error signal;
   - a frequency divider having a predetermined division factor and connected to the oscillator and responsive to the pulses therefrom for providing pulses at another lesser frequency in accordance with said division factor;
   - a feedback control loop connected to the frequency divider and to the signal means for applying the pulses at the other lesser frequency to drive the signal means to reduce the error signal at a faster rate as the error signal increases, with said pulse output from the oscillator thereupon representing condition rate;
   - means connected to the oscillator for converting the pulse output therefrom to a digital output including counting means, means for providing pulses at a predetermined frequency, gating means connected to the oscillator, to the pulse providing means and to the counting means and responsive to the pulses at the predetermined frequency for gating the oscillator pulses to the counter over a predetermined interval, with the counting means counting said gated pulses and providing digital output representing the count;
   - a digital-to-analog converter connected to the counting means for converting the digital output therefrom to an analog output; and
   - means connected to the digital-to-analog converter and to the feedback control loop for applying the analog signal to said feedback loop to provide loop stability.

2. Apparatus as described by claim 1, including: means for connecting the signal means to the oscillator to limit the swing of the error voltage.

3. Apparatus as described by claim 1, wherein the last mentioned means includes:
   - means responsive to the sense of the analog signal from the converter for maintaining negative feedback in the feedback control loop.

4. Apparatus as described by claim 1, wherein the counting means includes:
   - a counter for counting the gated oscillator pulses; and
   - a storage register connected to the counter for providing a constant output during the time that the counter is counting.